United States Patent [19]

Kochi

[11] Patent Number: 4,838,604
[45] Date of Patent: Jun. 13, 1989

[54] OPEN-TOP VEHICLE BODY

[75] Inventor: Yasuhisa Kochi, Hiroshima, Japan

[73] Assignee: Mazda Motor Corporation, Hiroshima, Japan

[21] Appl. No.: 148,548

[22] Filed: Jan. 26, 1988

[30] Foreign Application Priority Data

Jan. 28, 1987 [JP] Japan .................... 62-11769[U]

[51] Int. Cl.⁴ .................................................. B62D 35/00
[52] U.S. Cl. ................................. 296/180.5; 296/107
[58] Field of Search .............. 296/1 S, 186, 206, 217, 296/65 R, 107, 84 C, 116; 280/756

[56] References Cited

U.S. PATENT DOCUMENTS

| 1,784,279 | 12/1930 | Ellerbeck | 296/107 |
| 3,246,923 | 4/1966 | Turner | 296/1 S |
| 4,538,852 | 9/1985 | Lobo et al. | 296/217 X |
| 4,557,502 | 12/1985 | Scaduto et al. | 296/186 X |
| 4,669,780 | 6/1987 | Sakakibara et al. | 296/65 R X |
| 4,707,788 | 11/1987 | Tashiro et al. | 296/65 R X |

FOREIGN PATENT DOCUMENTS

| 175478 | 12/1952 | Austria | 296/107 |
| 0233777 | 8/1987 | European Pat. Off. | 296/1 S |
| 658553 | 12/1963 | Italy | 296/84 C |
| 61-59121 | 9/1984 | Japan . | |
| 21980 | of 1911 | United Kingdom | 296/116 |
| 2182010 | 5/1987 | United Kingdom | 296/1 S |

OTHER PUBLICATIONS

Autobody, Oct. 1929, p. 137, "Ellerbeck Convertible Metal-Top Coupe".

Primary Examiner—Dennis H. Pedder
Attorney, Agent, or Firm—Fleit, Jacobson, Cohn, Price, Holman & Stern

[57] ABSTRACT

An open-top vehicle body having a passenger compartment defined rearward of the front windshield, a rigid shield member swingably mounted on the vehicle body. The shield member can move between an upright position where the shield member projects from the belt line upward to block a wind blast into the passenger compartment and a retracted position where the shield member is retracted under the belt line to allow the wind blast to flow forward into the passenger compartment.

31 Claims, 10 Drawing Sheets

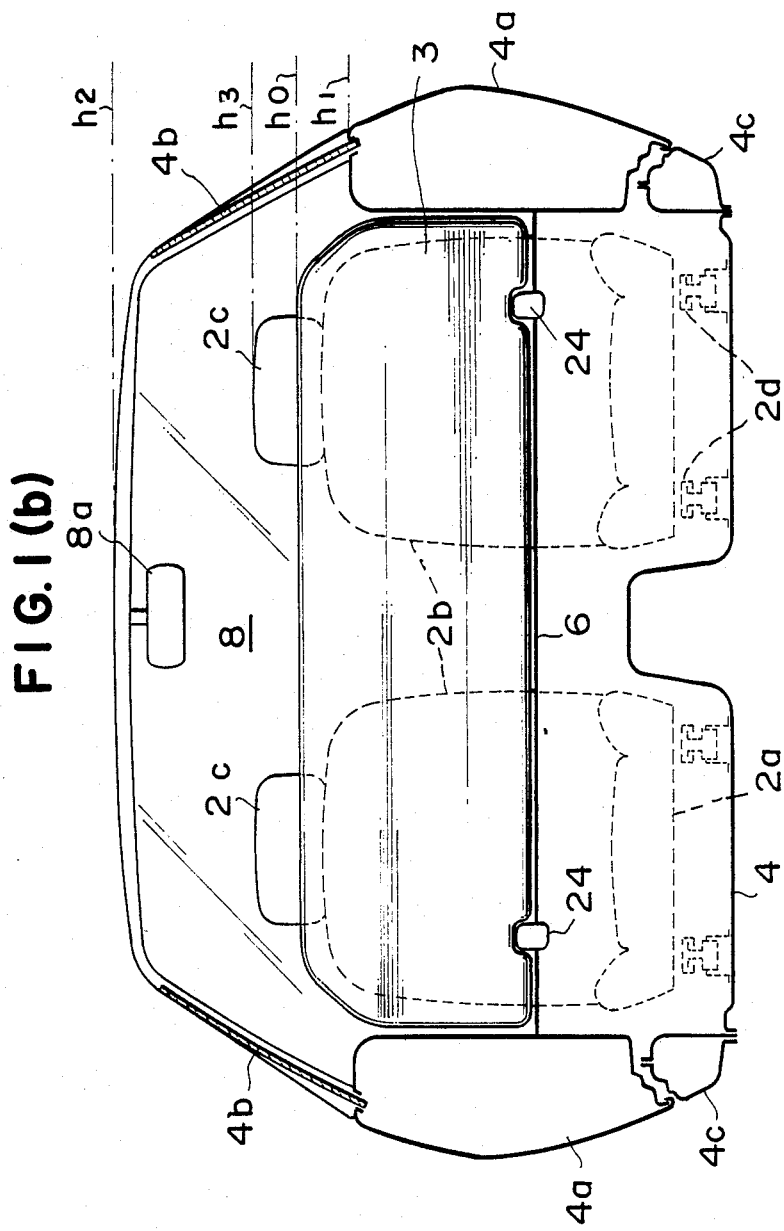

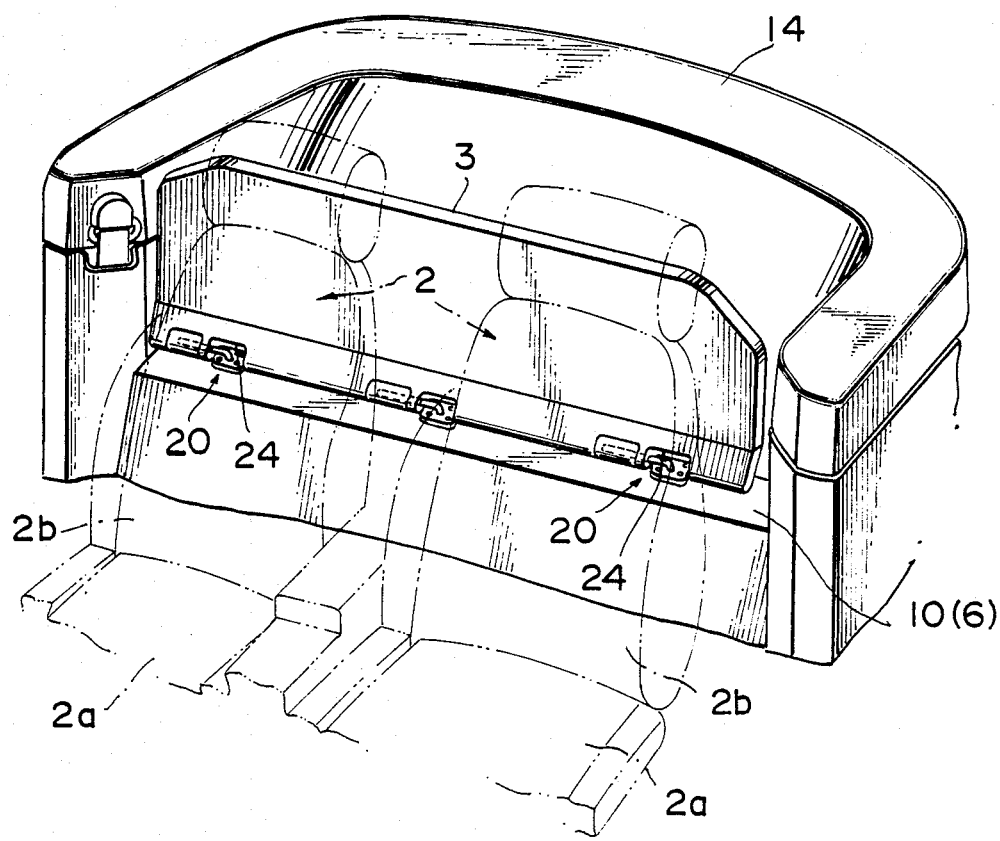

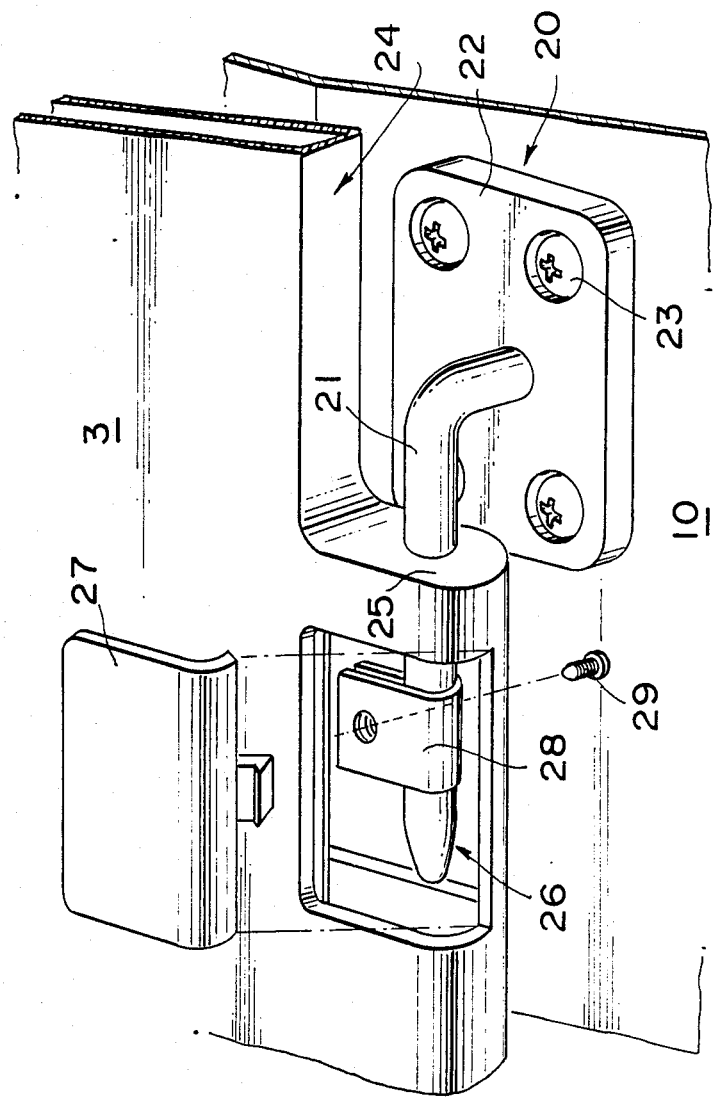

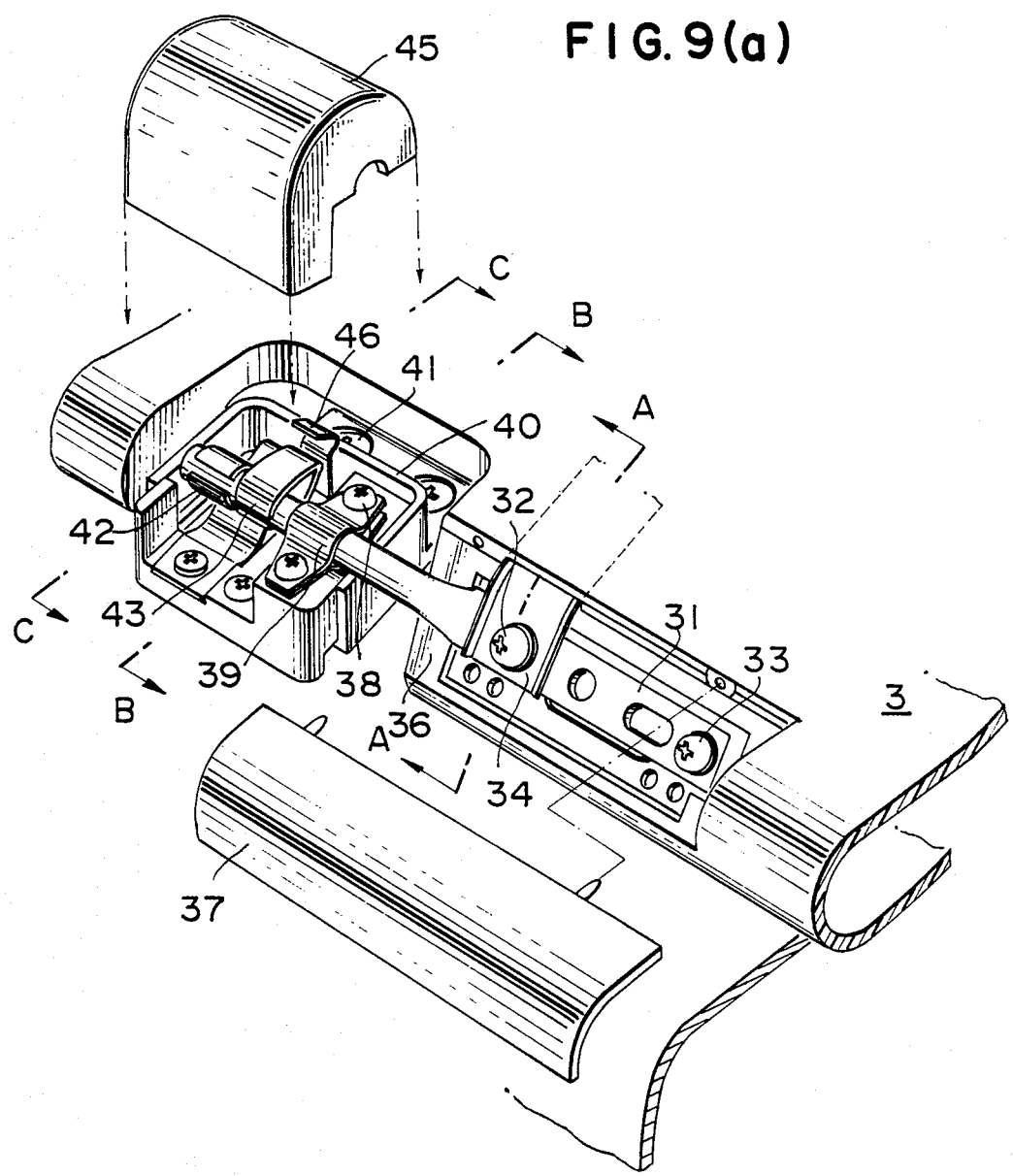

OPEN-TOP VEHICLE BODY

BACKGROUND OF THE INVENTION

1. Field of the Invention

The present invention relates to a vehicle body and more particularly to an open-top vehicle body. More specifically, the present invention pertains to means for preventing an air stream from blowing into a front passenger compartment while the vehicle is running, with the means being easily retractable without bulking in the compartment.

In the open-top or so called cabriolet type vehicles, there are generally provided with retractable roof structures which can be moved between an extended position of the vehicle where the roof structure covers the top portion of the vehicle body and a retracted position where the roof structure is retracted into the vehicle rear body section to open the top portion of the vehicle body. In the extended position, the roof structure is secured to the front edge portion of a front windshield. When the vehicle is operated so that the roof structure is retracted to open the top portion of the body, an air flow toward the compartment is shut off by the front windshield. However the height of the windshield is restricted in order to reduce an air resistance during running and for a good external appearance so that there is produced a problem that a part of an air flow deflected upwardly by the windshield produces a downward and turbulent flow in the vicinity of the rear seat and is directed from the rear body forwardly to the passenger compartment. Such forwardly directed air stream chills the passengers in the front seats uncomfortably. In order to eliminate this problem, there has been proposed for instance, a structure of a windshield provided with an air deflector which is projected upwardly from the upper end of the windshield to thereby divert the air stream upwardly from the passenger compartment. However, in the proposed structure, the deflector become an obstacle when the roof structure is moved to the extended position so that the deflector is needed to be removed in the extended position of the roof structure. In constituting such removable deflector, the deflector is subjected to a severe wind pressure during running of the vehicle so that the removable deflector is necessary to be mounted on the windshield rigidly. This means that the fixing structure of the deflector becomes complicated undesirably. Additionally, it is necessary to prepare a space for the deflector.

In this connection, Japanese Utility Model Public Disclosure No. 61-59121 laid-open to the public on Apr. 21, 1986, discloses an air flow deflecting device provided with a deflector which is mounted on the front windshield to move in the up and down direction. The deflector is adapted to project or retract in the windshield in response to the operation of the retractable roof structure.

In the structure disclosed in the Japanese Utility Model application, the deflector is retracted downwardly to be overlapped with the upper portion of the windshield when the roof structure covers the passenger compartment so that the deflector reduces the visual range of the passengers through the front windshield. This reduced visual range would be uncomfortable to the passengers.

SUMMARY OF THE INVENTION

It is therefore an object of the present invention to provide an open-top or convertible vehicle body in which an air stream directed from the rear part of the vehicle body forwardly to the front passenger compartment can be prevented.

It is another object of the invention to provide a shield device for preventing a turbulent air flow from being introduced to the passenger compartment, which device can be easily retracted into the vehicle body.

It is further object of the invention to provide an open-top vehicle body structure having a shield device rearward of passenger seats for blocking an air stream toward the passenger compartment.

According to the present invention, the above and other objects can be accomplished by an open-top vehicle body including a front windshield, a passenger compartment defined rearward of the front windshield, side walls defining opposite side ends of the passenger compartment and having upper edges defining side belt lines, a floor panel defining a bottom end of the passenger compartment, passenger seat members disposed in the passenger compartment, a shield member placed rearward of the seat members and extended across the belt lines in the up and down direction, said shield member being disposed in the traverse direction of the vehicle body and constituted by a rigid panel member so as to prevent a swirling wind blast which flows from the rearward of the passenger compartment into the passenger compartment forwardly, and said shield member being movably mounted on the vehicle body by supporting means so that the shield member swings forwardly from an upright position where the shield member projects from the belt lines upward to block the wind blast into the passenger compartment to a retracted position where the shield member is retracted under the belt line to allow the wind blast to flow forward into the passenger compartment.

The supporting member may be located in the vicinity of a member of vehicle body, such as side wall, floor panel and the passenger seat member at a level lower than the upper end of the passenger seat member. The shield member is lower than the upper end of the passenger seat member at the retracted position and higher than that at the upright position. The shield member is preferably disposed along the surface of the vehicle body when the shield member is in the retracted position.

The seat member is constituted by a seat and seat back of which angular position can be pivotally adjusted. Preferably, the shield member can be pivotally moved between the upright position and the retracted position when the seat back swings forwardly.

The shield member has such a curved configuration that the shield member lies along the floor panel at the retracted position thereof.

The above and other objects and features of the present invention will become apparent from the following descriptions of preferred embodiments taking reference to the accompanying drawings.

BRIEF DESCRIPTION OF THE DRAWINGS

FIG. 1(b) is a schematically transversely sectional view of the vehicle body shown in FIG. 1.

FIG. 3 is a partially perspective view showing specifically the rear portion of the compartment of the vehicle in FIG. 2.

FIG. 5 is a detailed perspective view of a connecting portion of the aero-board shown in FIG. 4.

FIG. 9(a) is a detailed perspective view showing specifically a connecting portion of the aero-board of the embodiment of FIG. 7 at the upright position.

DESCRIPTION OF THE PREFERRED EMBODIMENTS

Figure 1A:
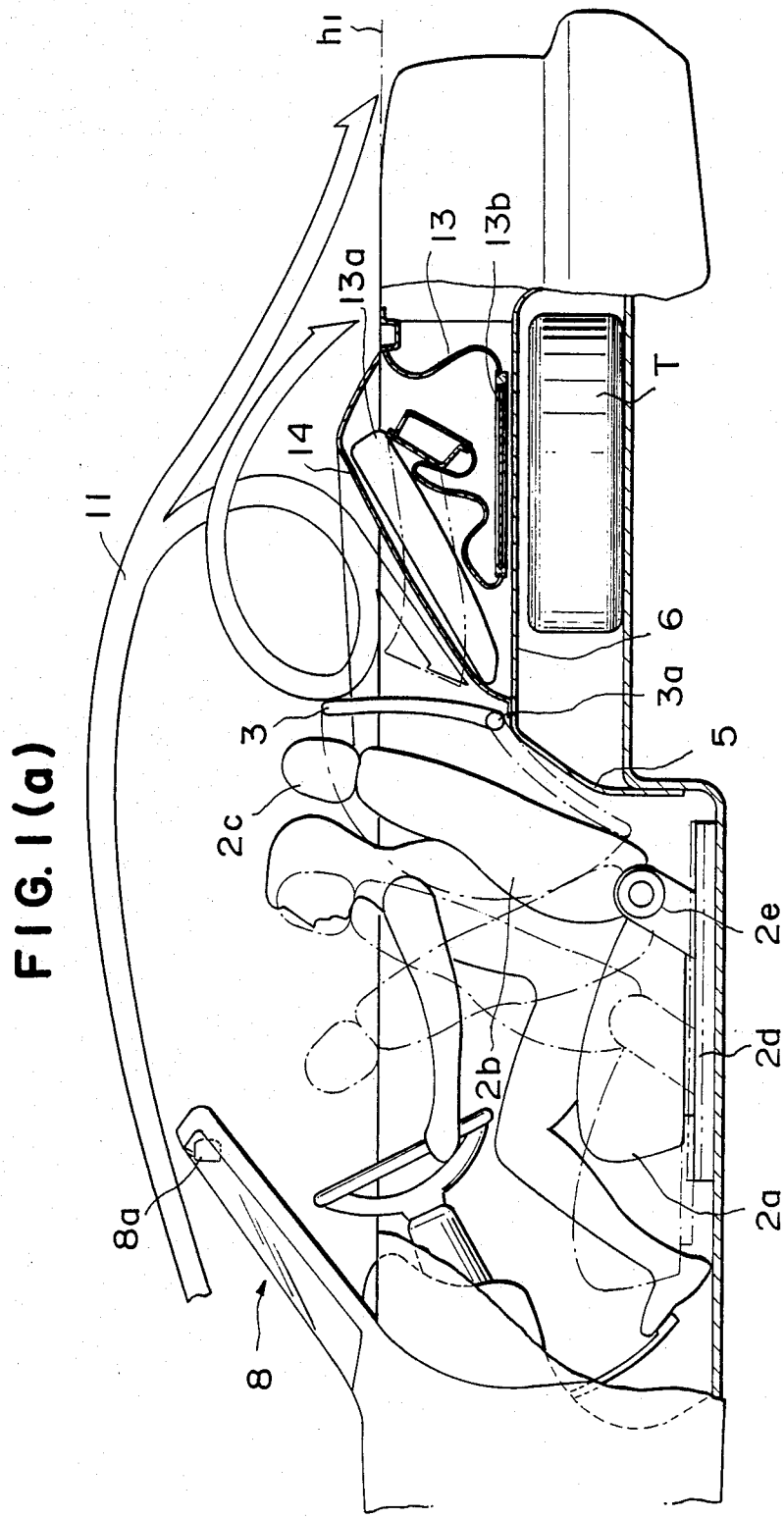
FIG. 1(a) is a schematically longitudinally sectional view of a convertible vehicle body in accordance with one embodiment of the present invention.
Figure 2:
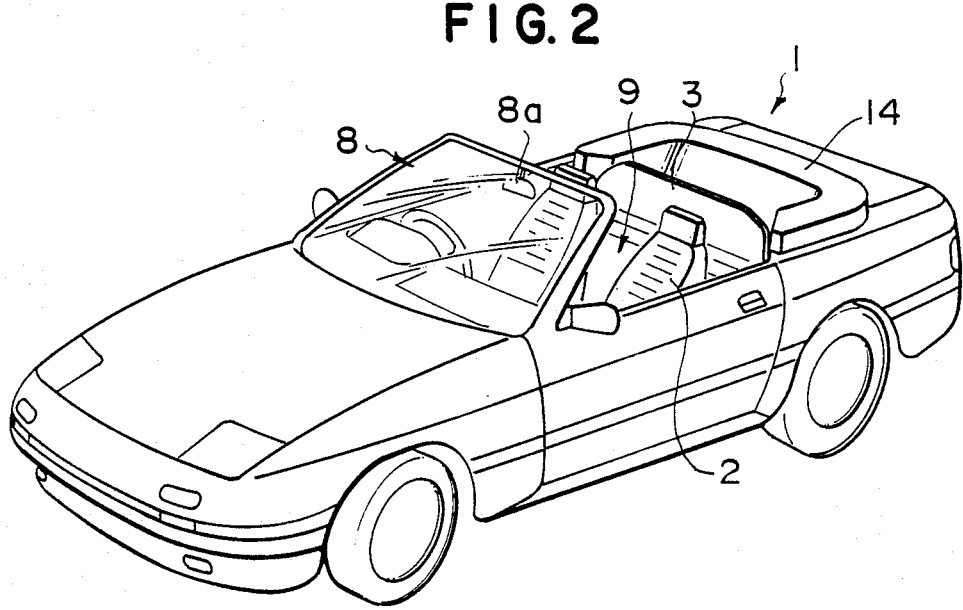
FIG. 2 is a schematic perspective view of a vehicle to which the present invention is applied.

Referring now to the drawings, particularly to FIG. 1(a), 1(b) and 2, there is shown a convertible type vehicle 1 provided with a pair of seat devices 2 disposed in the front portion of a passenger compartment 9 and an aero-board or shield member 3 which is retractable into the rear portion of the compartment 9. The vehicle 1 is provided with a retractable roof structure 13 with a hard roof portion 13a and rear windshields 13b which is adapted covered by a cover member 14 when the roof structure is folded to be retracted so as to open the compartment.

The vehicle 1 is also provided with a floor panel 7 constituted by a front panel portion 4, a wall portion 5 extending upwardly from the rear end of the front panel portion 4 and a rear panel portion or spare tire cover trim 6 for a spare tire T extending rearwardly from the upper end of the wall portion 5. The vehicle is further provided with a front windshield 8 defining the front end of the compartment 9. On the front windshield, a rear view mirror 8a is mounted. The seat device 2 provided on the front panel portion 4 is constituted by a seat 2a, a seat back 2b and a head rest 2c. The seat device 2 is slidably mounted on the front panel portion 4 in the longitudinal direction of the vehicle 1 by means of a slider mechanism 2d. The seat back 2b can be adjusted in the reclining angle thereof through the reclining mechanism 2e. The aero-board 3 is disposed transversely at the front edge portion 10 of the rear panel portion 6. The aero-board 3 can swing around an transverse axis 3a positioned at an end of the aero-board 3. The aero-board 3 is constituted by a rigid and opaque resin member. The aero-board 3, as shown in FIG. 1(b) is disposed in a manner that the level $h_0$ of the upper end of the aero-board 3 is higher than the level $h_1$ of belt lines defined by the upper ends of side panels or side door panels 4a and lower than the level $h_2$ of the upper end of the windshield 8. The side panel 4a can receive a side windshield 4b therein. The front panel portion 4 is connected to side sills 4c at the opposite ends. In addition, the level $h_0$ of the aero-board is lower than the level $h_3$ of the upper end of the seat devices 2 by a certain amount so as to enable the passenger in the seat devices 2 to look out the rearward of the vehicle.

The aero-board 3, as shown in FIG. 1(a), can swing between an upright position shown by a real line and a retracted position shown by a broken line where the aero-board 3 is extended downwardly from the pivot axis 3a along the wall portion 5.

The aero-board 3, as shown in FIG. 3, is secured to a connecting portion 10 between the wall portion 5 and the rear panel portion 6 by means of connecting devices 20 so as to swing between the upright position and the retracted position. In the case where the aero-board 3 is in the upright position when the vehicle 1 is running, the connecting devices 20 assure that the aero-board 3 subjected to the wind blast is maintained at the upright position In retracting the aero-board 3, the seat backs 2b swings to be inclined forwardly prior to the aero-board 3 swings forwardly to the retracted position Thereafter, the seat backs 2b are returned to the places where they were.

Figure 4:
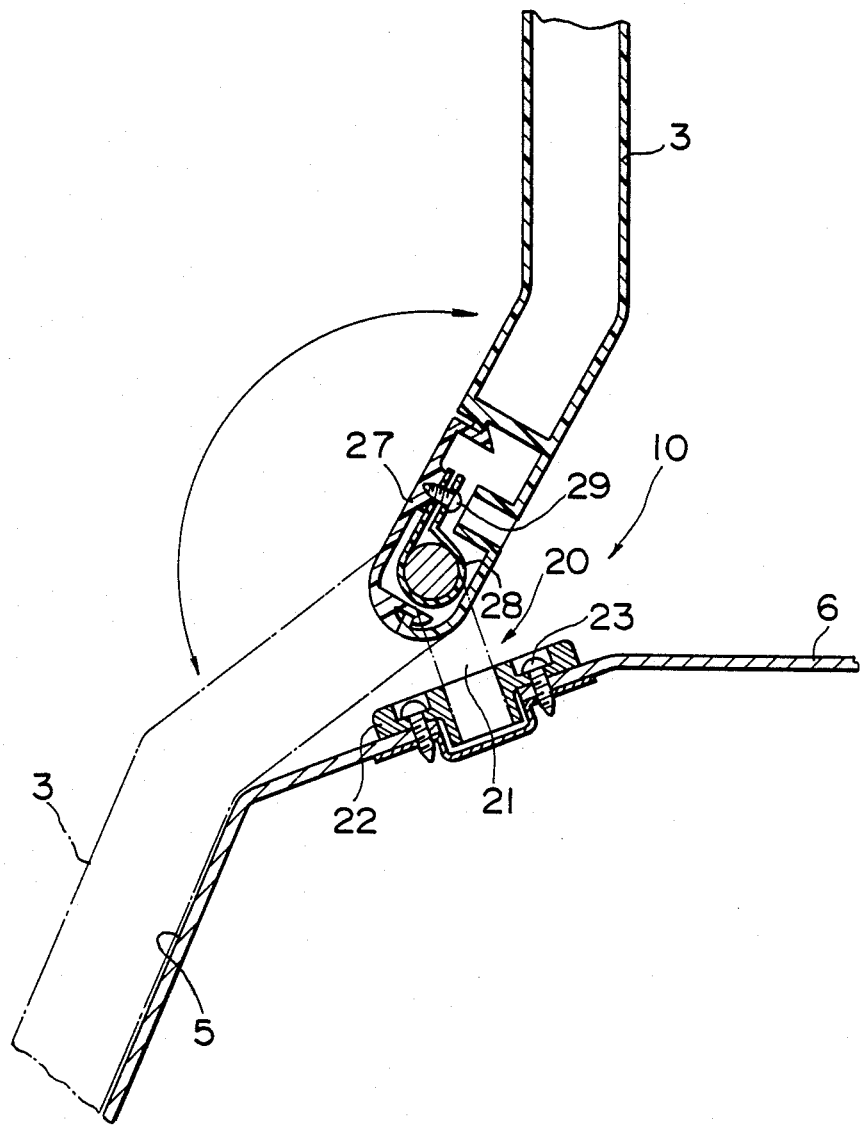
FIG. 4 is a partially sectional view showing an aero-board.

The connecting device 20, as shown in FIG. 4 and 5 is constituted by a fastener band 28 fixed to the aero-board 3, and a L-shaped shaft 21 secured to the fastener band 28 at one end portion and fixed to the front end portion 10 of the panel 6 at the other end portion thereof through a bracket 22 so that the aero-board 3 can be swingably moved. The bracket 22 is fixed to the front end portion 10 of the panel 6 by screws 23 at the lower end thereof There are formed cutout portions 24 at the lower edge portion of the aero-board 3 as shown in FIG. 3 to thereby form a journal portion 25 at one side thereof and a rectangular opening 26 as shown in FIG. 5. A cover member 27 is applied to the opening 26. The tip end portion of the shaft 21 is connected to the back side of the cover member 27 through the fastener band 28 so that the aero-board 3 can be swingably moved when a force more than a predetermined value is applied thereto. The fastener band 28 is mounted on the back side of the cover member 27 by means of an adjustable screw 29. The fastener band 28 is brought into a frictional engagement with the shaft so that the aero-board 3 can be stably maintained at any angular position between the upright position and the retracted position. The frictional engagement force between the fastener band 28 and the shaft can be adjustable by controlling the fixing torque applied to the screw 29. As a result, even where the seat device 2 is moved resulting from the operation of the slider mechanism 2d and/or the reclining mechanism 2e, the aero-board 3 does not interfere with such movement of the seat device 2 maintaining a position close thereto so that the aero-board 3 is effected to block a swirling air blast which is introduced from the sides of the vehicle body into the compartment.

In the case where the convertible roof structure 13 is folded into the rear part of the vehicle 1 being covered by the cover member 14 and where the vehicle 1 is running, a wind blast is deflected by the front windshield 8 and a part of the wind blast is directed forwardly in the form of a swirling stream 11 along the cover member 14 into the compartment 9 as shown in FIG. 1. In the illustrated embodiment, the swirling stream 12 can be deflected to the rearward of the vehicle 1 as shown by a real line in FIG. 1(a) by maintaining the aero-board 3 at the upright position wherein the aero-board 3 has a substantially same length as the breadth of the compartment in the transverse direction and is extended in the up-down direction across the belt line having a height of $h_1$. As a result, there can be effectively checked the air stream forward of the seats 2 through paths between seats 2 and between the seats 2 and side panels.

Figure 6:
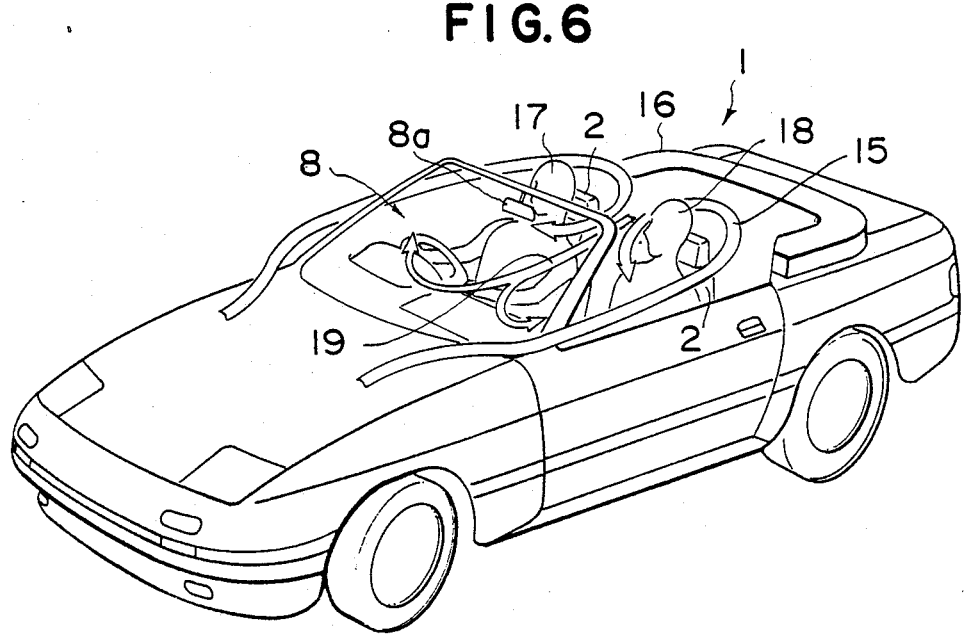
FIG. 6 is a perspective view showing stream lines of a wind blast passing through the sides of the vehicle.

As shown in FIG. 6, conventionally, air flows 15, 16 passing through the sides of the vehicle 1 circulate around passengers 17, 18 to flow forwardly between them 17, 18 to the front windshield 8, and turn to the backward producing a rearward stream 19 between the seats 2. The stream 19 affects to chill the passengers 17, 18 and sometimes blow off articles such as documents in the compartment 9. According to the illustrated embodiment, the aero-board 3 in the upright position is effected to prevent such rearward stream 19.

When the roof structure 13 is moved to cover and open the compartment 9, the aero-board 3 preferably swings to the retracted position where the aero-board 3 is positioned along the wall portion 5 in order to facilitate the operation of the roof structure 13.

As shown in FIG. 7 through 9(b), there is shown another embodiment of the present invention.

Figure 7:
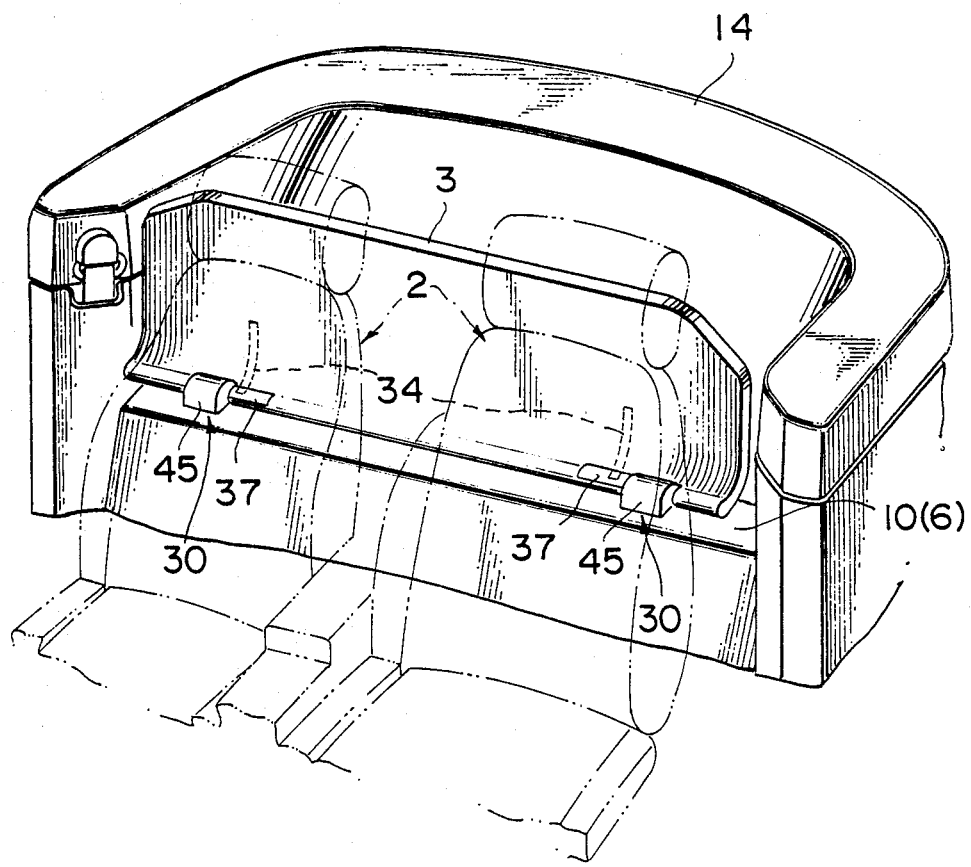
FIG. 7 is a similar view to FIG. 3 in accordance with another embodiment of the present invention.
Figure 8B:
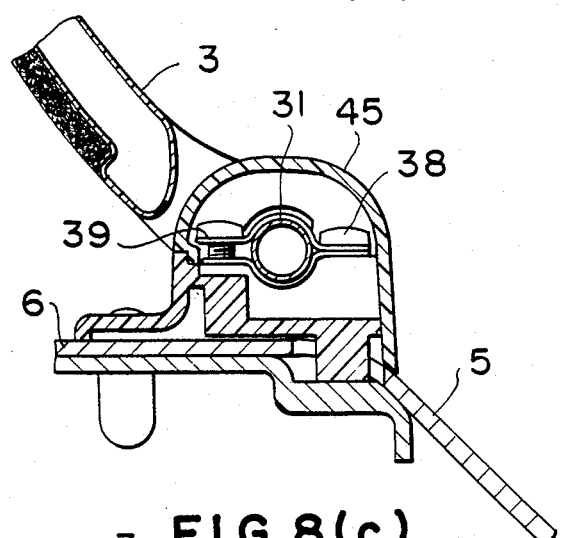
FIG. 8(b) is a sectional view of the embodiment of FIG. 7 taken along a line B—B in FIG. 9(a).
Figure 8C:
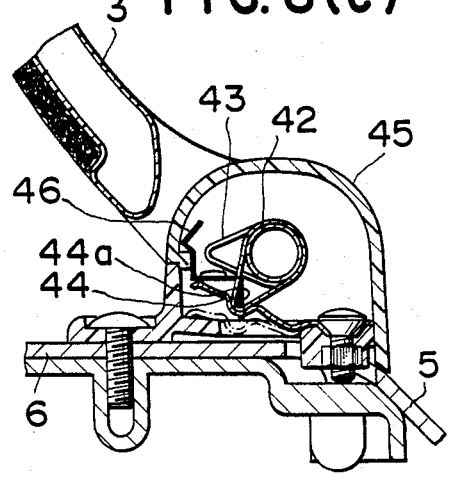
FIG. 8(c) is a sectional view of the embodiment of FIG. 7 taken along a line C—C in FIG. 9(a).
Figure 8A:
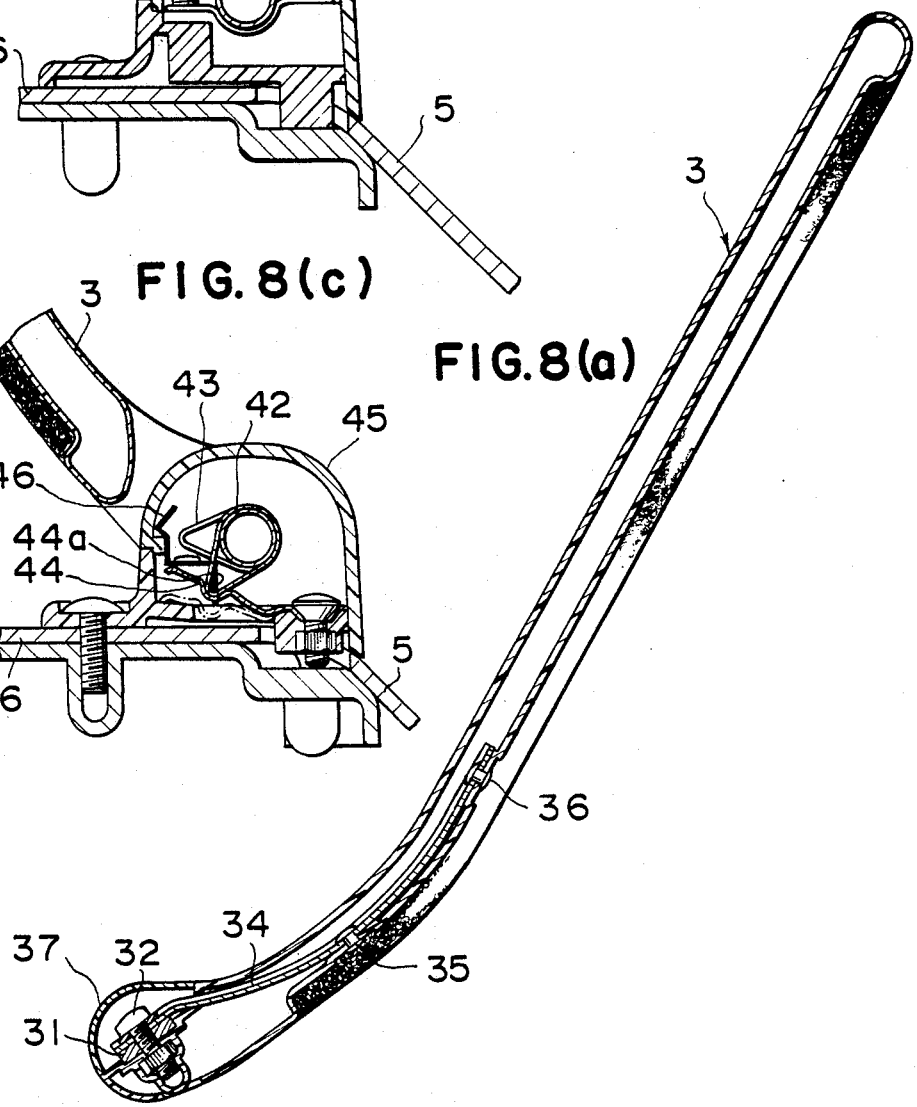
FIG. 8(a) is a sectional view of the aero-board 3 of the embodiment of FIG. 7 taken along a line A—A in FIG. 9(a).

Referring now to FIG. 7, the aero-board 3 is secured to the rear panel portion 6 by means of a pair of connecting devices 30. As shown in FIG. 9(a), a stay 31 is fixed to the cutout portion 3b at the tip end of the aero-board 3 through screws 32 and 33. In securing the stay 31, the stay 31 is fixed to the aero-board 3 through a bracket 34 by means of the screw 32. The bracket 34 is extended in the hollow aero-board 3 and fixed to the inside of the aero-boards boards by screws 35 and 36 as shown in FIG. 8(a) so as to improve the rigidity of the aero-board 3. The aero-board 3 has such a curved configuration as lying along the wall portion 5 at its retracted position and positioning the gravity center thereof rearward of the pivotal axis 3a at its upright position so that the aero-board can be stably maintained at the upright position. The connecting portion of the stay 31 with the aero-board 3 is covered by a stay cover 37 which is attached to the aero-board 3. The stay 31 is provided with a tubular portion extending transversely and as shown in FIG. 8(b), is rotatably secured at the intermediate portion thereof by screws 38 through a stay clip 39 to a stay holder 40 which is fixed to the front end portion 10 of the rear panel portion 9 by means of screws 41. The stay clip 39 is brought into a frictional engagement with the stay 31 so as to maintain the aero-board 3 at any angular position between the upright position and the retracted position. In order to obtain more stable support of the aero-board 3, the stay 31 is provided with a first setting clip 42 and second setting clip 43 at the tip end portion thereof for keeping the aero-board 3 stably at a predetermined angular position.

Figure 9B:
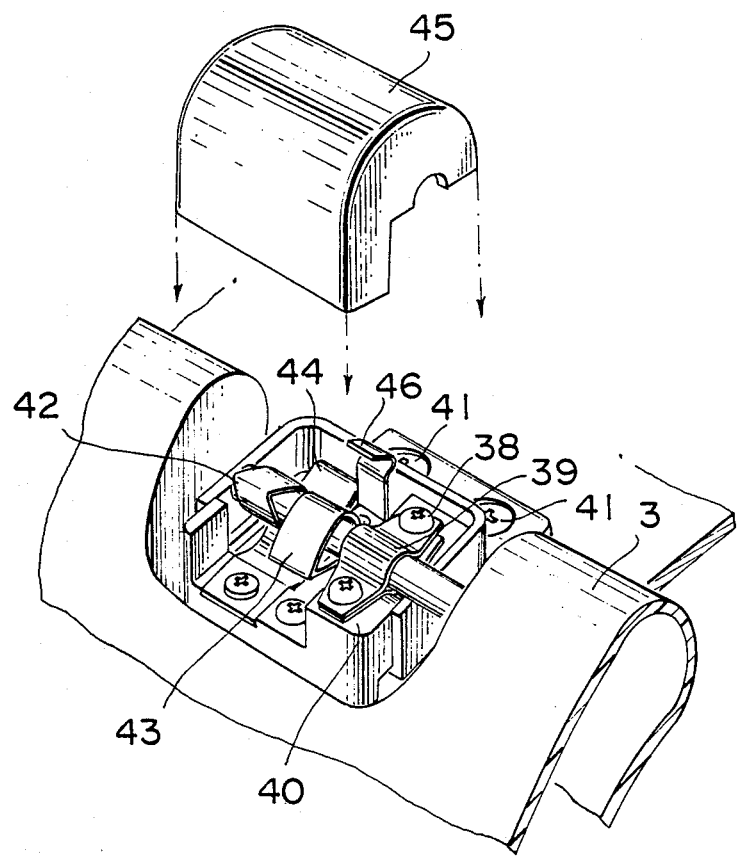
FIG. 9(b) is a similar perspective view to FIG. 9(b) but showing the retracted position of the aero-board.

The clips 42 and 43 are preferably mounted on the stay 31 by welding. The clips 42 and 43 are of claws projecting in the different angular directions. As shown in FIG. 8(c), the first clip 42 is adapted to be engaged with a recess 44a of a holder spring or leaf spring 44 at the upright position of the aero-board 3 so that the aero-board 3 can be stably maintained at the upright position against the wind blast. The aero-board 3 can readily swing to move from the upright position to the retracted position by applying a rotation force to the aero-board enough to overcome the resilience of the holder spring 44. Such force for effecting the movement of the aero-board 3 can be controlled by adjusting the resilience of the holder spring 44. The second setting clip 43 is brought into engagement with the upper surface of the holder spring 44 at the retracted position of the aero-board 3 as shown in FIG. 9(b). The above engaging mechanism is covered by a holder cover 45 which is attached to the stay holder 40. The holder cover 45 is adapted to be engaged with a projection of a leaf spring 46 fixed to the stay holder 40 and extending upwardly. The leaf spring 46 is brought into engagement with the second setting clip 43 when the aero-board 3 is in the retracted position so that the movement of the aero-board can be restricted. In other words, the leaf spring 46 functions as a resilient stopper limiting the rearward movement of the aero-board 3.

The aero-board 3 can follow a longitudinal movement of the seat device 2 caused by the operation of the slider mechanism 2d and/or the reclining mechanism 2e with being close to the seat device 2 so that the aero board 3 is effected to block a swirling air blast which is introduced from the sides of the vehicle body into the compartment.

The present invention has been described with reference to specific embodiments. However, it should be noted that the present invention is not intended to be limited to the details of the illustrated structures but all of the changes and modifications may be included in the scope of the claims appended.

I claim:

1. An open-top vehicle body comprising:
   a front windshield,
   a passenger compartment located behind said front windshield,
   side walls defining opposite sides of said passenger compartment, said side walls each having an upper edge defining side belt lines,
   a floor panel defining a bottom of said passenger compartment,
   passenger seat members located in said passenger compartment,
   a shield member located behind said seat members and extending in an upright position between said belt lines and from below said belt line to above said belt lines, said shield member extending in a transverse direction to the vehicle body and said shield member including a rigid panel member to prevent a swirling wind blast from flowing from behind said passenger compartment forwardly into said passenger compartment, and said shield member being swingably mounted on said floor panel by supporting means so that said shield member may swing forwardly from said upright position where said shield member projects from said floor panel to above said belt lines to block the wind blast into said passenger compartment to a retracted position where said shield member is retracted to below said belt lines to allow the wind blast to flow forward into said passenger compartment.

2. An open-top vehicle body in accordance with claim 1, wherein said supporting means supports said shield member to extend along said floor panel rearward of said passenger compartment when said shield member is in said retracted position.

3. An open-top vehicle body in accordance with claim 1, wherein said supporting means supports an upper end of said shield member so that it is positioned lower than an upper end of said seat member when said shield member is in said retracted position.

4. An open-top vehicle body in accordance with claim 1, wherein said supporting means supports an upper end of said shield member so that it is positioned lower than said belt lines when said shield member is in said retracted position.

5. An open-top vehicle body in accordance with claim 1, wherein said seat member includes a seat and a seat back connected to said seat, said seat being slidably mounted on said floor panel in a longitudinal direction of the vehicle, and said seat back being swingably mounted on said seat so that a reclining angle of said seat back can be adjusted.

6. An open-top vehicle body in accordance with claim 2, wherein said floor panel includes a front floor panel carrying said seat members, a wall panel extending upwardly from a rear end of said front floor panel and a rear floor panel extending rearwardly from an upper end of said wall panel, and said supporting means supports an upper end of said shield member so that it is positioned along said wall panel when said shield member is in said retracted position.

7. An open-top vehicle body in accordance with claim 6, wherein said shield member is swingably mounted at one end around a transverse axis located in the vicinity of a connecting portion of said wall panel and said rear floor panel.

8. An open-top vehicle body in accordance with claim 7, wherein said supporting means is provided with a transverse shaft fixed to one of the vehicle body and said shield member, and a holding member for rotatably carrying said shaft and said holding member being fixed to the other of the vehicle body and said shield member.

9. An open-top vehicle body in accordance with claim 8, wherein said holding member includes a stay clip brought into frictional engagement with said shaft to allow rotatable movement of said shaft so that said shield member can be stably maintained at any angular position.

10. An open-top vehicle body in accordance with claim 8, wherein said holding member and a portion of said shield member engaged with said holding member are covered by a cover member.

11. An open-top vehicle body in accordance with claim 8, wherein said shield member is formed with a cutout portion at one end, and a part of said supporting means being disposed in said cutout portion.

12. An open-top vehicle body comprising:
a front windshield,
a passenger compartment located behind said front windshield,
side walls defining opposite sides of said passenger compartment, said side walls each having an upper edge defining side belt lines,
a floor panel defining a bottom of said passenger compartment,
passenger seat members movably disposed in said passenger compartment, each of said seat members being provided with a seat and a seat back swingably mounted whereon so that an angular position of said seat back can be adjusted by an adjusting mechanism attached to said seat back,
a shield member located behind said seat members and extending in an upright position between said belt lines and from below said belt lines to above said belt line, said shield member extending in a transverse direction to the vehicle body and said shield member including a rigid panel member to prevent a swirling wind blast from flowing from behind said passenger compartment forwardly into said passenger compartment, and said shield member being swingably mounted on said floor panel by supporting means so that said shield member may swing forwardly from said upright position where said shield member projects from said floor panel to above said belt lines to block the wind blast into said passenger compartment to a retracted position where the shield member is retracted to below said belt lines to allow the wind blast to flow forward into said passenger compartment and the upright shield member being adapted to swingably moved by contact with at least one of said seat backs as said seat members are moved.

13. A open-top vehicle body in accordance with claim 12, wherein said shield member is swingably mounted on the vehicle body around a transverse axis located at one end of shield member, and said shield member being adapted to be maintained at said upright position by a holding member brought into frictional engagement with said shield member.

14. An open-top vehicle body in accordance with claim 12, wherein said adjusting mechanism includes reclining adjusting means for adjusting the angular position with respect to said seat of said seat back and slider adjusting means for adjusting the longitudinal position of said seat member with respect to said floor panel.

15. An open-top vehicle body in accordance with claim 12, wherein an upper end of said shield member is located lower than an upper end of said seat member when said shield member is in said retracted position.

16. An open-top vehicle body in accordance with claim 12, wherein a storage space is provided behind said seat member for receiving a convertible roof structure of the vehicle.

17. An open-top vehicle body comprising:
a front windshield,
a passenger compartment located behind said front windshield,
side walls defining opposite sides of said passenger compartment, said side walls each having upper edges defining side belt lines,
a floor panel defining a bottom of said passenger compartment,
passenger seat members located in said passenger compartment,
a shield member located behind said seat members and extending in an upright position between said belt lines and from below said belt lines to above said belt lines, said shield member extending in a transverse direction to the vehicle body and said shield member including a rigid panel member to prevent a swirling wind blast from flowing from behind said passenger compartment forwardly into said passenger compartment, and said shield member being swingably mounted on said floor panel by supporting means so that said shield member may swing forwardly from said upright position where said shield member projects from said floor panel to above said belt lines to block the wind blast into said passenger compartment to a retracted position where the shield member is retracted to below said belt lines to allow the wind blast to flow forward into said passenger compartment.

18. An open-top vehicle body in accordance with claim 17, wherein said shield member is swingably mounted at one end around a transverse axis.

19. An open-top vehicle body in accordance with claim 17, wherein a pair of seat members is disposed in said passenger compartment side by side in a transverse direction of the vehicle, there being a space between said seat members, and said shield member being placed rearward of said seat members and extending so as to cover the space.

20. An open-top vehicle body in accordance with claim 17, wherein said upright shield member blocks wind blast through a space formed between said seat members and said side walls of the vehicle.

21. An open-top vehicle body in accordance with claim 17, wherein said shield member has a curved configuration so that said shield member extends upwardly and rearwardly at a lower portion thereof and extends generally vertically at an upper portion thereof in said upright position.

22. An open-top vehicle body in accordance with claim 18, wherein said supporting means includes a shaft extending transversely and fixed to one of said shield member and said floor panel, and a holding member fixed to the other of said shield member and said floor panel, and said holding member rotatably carrying said shaft.

23. An open-top vehicle body in accordance with claim 19, wherein spaces are formed between the sides of said seat members and said side walls, and said shield member extends transversely to at least partially cover the spaces at a position rearward of said seat members.

24. An open-top vehicle body in accordance with claim 19, wherein said shield member is made of an opaque material, and an upper end of said shield member is located lower than an upper end of said front windshield.

25. An open-top vehicle body in accordance with claim 22, wherein said supporting means includes at least one engaging member formed on said shaft and said holding member engages with said engaging member so as to maintain said shield member at said upright position.

26. An open-top vehicle body in accordance with claim 25, wherein said engaging member is provided with a projection extending radially from said shaft, and said holding member includes a resilient leaf spring member and is fixed to one of said floor panel and said shield member at one end portion formed with a recess for engaging said projection.

27. An open-top vehicle body in accordance with claim 25, wherein said shield member is provided with a stopper for limiting the swingable movement thereof, said stopper being adapted to be engaged with a member fixed to said floor panel.

28. An open-top vehicle body in accordance with claim 26, wherein said leaf spring is brought into engagement with said engaging member when said leaf spring is deformed by a predetermined amount.

29. An open-top vehicle body in accordance with claim 13, wherein said supporting means is provided with a transverse shaft fixed to one of the vehicle body and said shield member, and said holding member rotatably carrying said shaft and being fixed to the other of the vehicle body and said shield member.

30. An open-top vehicle body in accordance with claim 29, wherein said holding member includes a leaf spring having a holding portion which is brought into frictional engagement with said shaft to allow rotatable movement of said shaft so that shield member can be stably maintained at any angular position.

31. An open-top vehicle body in accordance with claim 24, wherein an upper end of said upright shield member is lower than an upper end of said seat member.

* * * * *